(12) United States Patent
DeCusatis (10) Patent No.: US 9,325,977 B2
(45) Date of Patent: Apr. 26, 2016

(54) THREE DIMENSIONAL LCD MONITOR DISPLAY

(75) Inventor: Casimer M. DeCusatis, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 312 days.

(21) Appl. No.: 13/357,707

(22) Filed: Jan. 25, 2012

(65) Prior Publication Data

US 2013/0187904 A1 Jul. 25, 2013

(51) Int. Cl.
*H04N 13/04* (2006.01)

(52) U.S. Cl.
CPC ....... *H04N 13/0434* (2013.01); *H04N 13/0422* (2013.01)

(58) Field of Classification Search
CPC .. G09G 3/36; H04N 13/0434; H04N 13/0422
See application file for complete search history.

(56) References Cited

U.S. PATENT DOCUMENTS

| | | |
|---|---|---|
| 4,630,097 A | 12/1986 | Marks |
| 4,870,486 A | 9/1989 | Nakagawa et al. |
| 5,113,285 A | 5/1992 | Franklin et al. |
| 5,142,366 A | 8/1992 | Brown et al. |
| 5,168,199 A | 12/1992 | Huffman et al. |
| 5,420,484 A | 5/1995 | Morrish |
| 5,751,479 A | 5/1998 | Hamagishi et al. |
| 6,040,946 A | 3/2000 | Hebert |
| 6,327,093 B1 | 12/2001 | Nakanishi et al. |
| 6,344,927 B1 | 2/2002 | Itoh et al. |
| 6,359,664 B1 | 3/2002 | Faris |
| 6,672,722 B2 | 1/2004 | O'Connor et al. |
| 6,704,065 B1 | 3/2004 | Sharp et al. |
| 6,813,085 B2 | 11/2004 | Richards |
| 7,081,997 B2 | 7/2006 | Sedlmayr |
| 7,119,957 B2 | 10/2006 | Itoh et al. |
| 7,270,428 B2 | 9/2007 | Alasaarela et al. |
| 7,283,308 B2 | 10/2007 | Cossairt et al. |
| 7,401,923 B2 | 7/2008 | Fergason |
| 7,446,733 B1 | 11/2008 | Hirimai |
| 7,468,844 B2 | 12/2008 | Hall, Jr. |
| 7,477,220 B2 | 1/2009 | Muto |
| 7,561,322 B1 | 7/2009 | Maeda et al. |
| 7,649,915 B2 | 1/2010 | Fermann et al. |

(Continued)

FOREIGN PATENT DOCUMENTS

| | | |
|---|---|---|
| CN | 1624525 A | 6/2005 |
| CN | 1666269 A | 9/2005 |

(Continued)

OTHER PUBLICATIONS

U.S. Appl. No. 13/672,877; Non Final Office Action; Date Filed: Nov. 9, 2012; Date Mailed: Oct. 3, 2013; pp. 1-24.

(Continued)

*Primary Examiner* — Aneeta Yodichkas
(74) *Attorney, Agent, or Firm* — Cantor Colburn LLP; Steven Chiu (57) ABSTRACT

A pixel matrix located on a liquid crystal display (LCD) that includes a plurality of first pixels having a first polarization; a plurality of second pixels having a second polarization; and a plurality of electrodes configured to activate the first pixels followed by the second pixels, the activating at twice a frame rate of the LCD.

10 Claims, 5 Drawing Sheets

(56) References Cited

U.S. PATENT DOCUMENTS

| | | | |
|---|---|---|---|
| 7,692,605 | B2 | 4/2010 | Tsao |
| 7,766,490 | B2 | 8/2010 | Harbers et al. |
| 7,773,160 | B2 | 8/2010 | Yamazaki et al. |
| 7,848,370 | B2 | 12/2010 | Kewitsch et al. |
| 8,337,020 | B2 | 12/2012 | Handschy et al. |
| 8,388,138 | B1* | 3/2013 | Boothroyd .................. 353/7 |
| 2002/0191235 | A1 | 12/2002 | O'Connor et al. |
| 2003/0179791 | A1 | 9/2003 | Hiroshi et al. |
| 2004/0109329 | A1 | 6/2004 | Kato |
| 2004/0155207 | A1 | 8/2004 | Kleinschmidt |
| 2004/0201879 | A1 | 10/2004 | Shih et al. |
| 2004/0207879 | A1 | 10/2004 | Bailey et al. |
| 2006/0050049 | A1* | 3/2006 | Lin ................. G09G 3/3413 345/102 |
| 2006/0187393 | A1 | 8/2006 | Kuan et al. |
| 2006/0232845 | A1 | 10/2006 | Harned et al. |
| 2006/0238716 | A1 | 10/2006 | Lee et al. |
| 2006/0279662 | A1 | 12/2006 | Kapellner et al. |
| 2006/0290889 | A1 | 12/2006 | Robinson et al. |
| 2007/0035830 | A1 | 2/2007 | Matveev et al. |
| 2007/0139519 | A1 | 6/2007 | DeCusatis et al. |
| 2007/0139618 | A1 | 6/2007 | DeCusatis et al. |
| 2007/0139769 | A1 | 6/2007 | DeCusatis et al. |
| 2007/0146880 | A1 | 6/2007 | Bleha et al. |
| 2007/0181834 | A1 | 8/2007 | Kleinschmidt |
| 2007/0188863 | A1 | 8/2007 | Sun et al. |
| 2007/0195408 | A1 | 8/2007 | Divelbiss et al. |
| 2008/0018999 | A1 | 1/2008 | Schuck et al. |
| 2008/0043295 | A1 | 2/2008 | Sakakibara |
| 2008/0055550 | A1 | 3/2008 | Kim |
| 2008/0094577 | A1 | 4/2008 | Krijn et al. |
| 2008/0151193 | A1 | 6/2008 | Reder |
| 2009/0040463 | A1 | 2/2009 | Chen et al. |
| 2009/0086016 | A1 | 4/2009 | Su |
| 2009/0141242 | A1 | 6/2009 | Silverstein et al. |
| 2009/0180181 | A1 | 7/2009 | Oakley |
| 2009/0207379 | A1 | 8/2009 | Oakley |
| 2009/0231549 | A1 | 9/2009 | Chen et al. |
| 2009/0310042 | A1 | 12/2009 | Vidal et al. |
| 2010/0039624 | A1 | 2/2010 | Fujinawa et al. |
| 2010/0045938 | A1 | 2/2010 | Lin et al. |
| 2010/0110386 | A1 | 5/2010 | Handschy et al. |
| 2010/0118276 | A1 | 5/2010 | Li |
| 2010/0141856 | A1 | 6/2010 | Schuck et al. |
| 2010/0171909 | A1 | 7/2010 | Handschy |
| 2010/0189344 | A1 | 7/2010 | Maes |
| 2010/0208210 | A1 | 8/2010 | Aastuen et al. |
| 2010/0238097 | A1* | 9/2010 | Baik et al. .................. 345/87 |
| 2010/0238413 | A1 | 9/2010 | Huang |
| 2010/0253769 | A1 | 10/2010 | Coppeta et al. |
| 2010/0272138 | A1 | 10/2010 | Chiba et al. |
| 2011/0089315 | A1 | 4/2011 | Walt et al. |
| 2011/0116051 | A1 | 5/2011 | Young et al. |
| 2011/0149253 | A1 | 6/2011 | Mihashi |
| 2011/0204793 | A1* | 8/2011 | Gardner, Jr. .............. 315/150 |
| 2011/0205251 | A1* | 8/2011 | Auld ........................ 345/690 |
| 2011/0211168 | A1 | 9/2011 | Kim et al. |
| 2011/0273539 | A1 | 11/2011 | Yoon et al. |
| 2012/0019529 | A1* | 1/2012 | Kimpe ....................... 345/419 |
| 2012/0050261 | A1* | 3/2012 | Feng et al. ................ 345/419 |
| 2012/0287144 | A1 | 11/2012 | Gandhi et al. |
| 2012/0307211 | A1 | 12/2012 | Hofmann et al. |
| 2013/0077283 | A1 | 3/2013 | Li |
| 2013/0082994 | A1* | 4/2013 | Al-Dahle .................. 345/208 |
| 2013/0147393 | A1 | 6/2013 | Bazzani et al. |

FOREIGN PATENT DOCUMENTS

| | | |
|---|---|---|
| CN | 1721961 A | 1/2006 |
| CN | 1854810 A | 11/2006 |
| CN | 1885096 A | 12/2006 |
| CN | 1987552 A | 6/2007 |
| CN | 101196615 A | 6/2008 |
| CN | 101364037 A | 2/2009 |
| CN | 101373054 A | 2/2009 |
| CN | 101482665 A | 7/2009 |
| CN | 101571631 A | 11/2009 |
| CN | 101625467 A | 1/2010 |
| CN | 101770150 A | 7/2010 |
| CN | 201576164 U | 9/2010 |
| CN | 102043254 A | 5/2011 |
| CN | 102089701 A | 6/2011 |
| CN | 102193239 A | 9/2011 |
| CN | 202057900 U | 11/2011 |
| CN | 102289141 A | 12/2011 |
| CN | 102300108 A | 12/2011 |
| JP | 2000284223 A | 10/2000 |
| JP | 2001222064 A | 8/2001 |
| JP | 2007065408 A | 3/2007 |
| JP | 2008064809 A | 3/2008 |
| WO | 9952269 | 10/1999 |
| WO | 2005032150 A1 | 4/2005 |
| WO | 2008042615 A1 | 4/2008 |
| WO | 2010143891 A2 | 12/2010 |

OTHER PUBLICATIONS

U.S. Appl. No. 13/672,980; Non Final Office Action; Date Filed: Nov. 9, 2012; Date Mailed: Nov. 8, 2013; pp. 1-41.
U.S. Appl. No. 13/357,737; Notice of Allowance; Date Filed: Jan. 25, 2012; Date Mailed: Nov. 22, 2013; pp. 1-56.
U.S. Appl. No. 13/672,947; Non Final Office Action; Date Filed: Nov. 9, 2012; Date Mailed: Nov. 26, 2013; pp. 1-40.
U.S. Appl. No. 13/673,112; Non Final Office Action; Date Filed: Nov. 9, 2012; Date Mailed: Dec. 13, 2013; pp. 1-42.
U.S. Appl. No. 13/357,725; Notice of Allowance; Date Filed: Jan. 25, 2012; Date Mailed: Nov. 20, 2013; pp. 1-33.
U.S. Appl. No. 13/651,780; Notice of Allowance; Date Filed: Oct. 15, 2012; Date Mailed: Dec. 23, 2013 pp. 1-21.
U.S. Appl. No. 13/357,704; Final Office Action; Date Filed: Jan. 25, 2012; Date Mailed: Oct. 30, 2013; pp. 1-23.
U.S. Appl. No. 13/357,704; Non Final Office Action; Date Filed: Jan. 25, 2012; Date Mailed: Jul. 15, 2013; pp. 1-24.
U.S. Appl. No. 13/357,719; Non Final Office Action; Date Filed: Jan. 25, 2012; Date Mailed: Jul. 26, 2013; pp. 1-33.
U.S. Appl. No. 13/357,725; Non Final Office Action; Date Filed: Jan. 25, 2012; Date Mailed: Jul. 15, 2013; pp. 1-28.
International Application No. PCT/CN2013/070865; International Search Report and Written Opinion dated May 2, 2013, 14 pages.
International Application No. PCT/CN2013/070883; International Search Report and Written Opinion dated May 2, 2013, 12 pages.
International Application No. PCT/CN2013/070888; International Search Report and Written Opinion dated May 2, 2013, 11 pages.
International Application No. PCT/CN2013/070831; International Search Report and Written Opinion dated May 9, 2013, 11 pages.
International Application No. PCT/CN2013/070828; International Search Report and Written Opinion dated Apr. 25, 2013, 13 pages.
Chen et al.; "Simple Multimode Stereoscopic Liquid Crystal Display"; Japanese Journal of Applied Physics; Part 2 (Letters); vol. 36; No. 12B; pp. L1685-8; Dec. 15, 1997.
Fergason et al.; An innovative beamsplitter-based stereoscopic/3D display design, Proceedings of SPIE—The International Society for Optical Engineering; vol. 5664; No. 1; pp. 488-494; Mar. 22, 2005.
Pezzaniti et al.; "Flat Panel 3D Display for Unmanned Ground Vehicles"; Proceedings of SPIE—The International Society for Optical Engineering; vol. 7332; pp. 73320N, 2009.
U.S. Appl. No. 13/673,462; Non-Final Office Action; Date Filed: Nov. 9, 2012; Date Mailed: Jan. 30, 2014; pp. 1-53.
U.S. Appl. No. 13/357,737; Notice of Allowance; Date Filed: Jan. 25, 2012; Date Mailed: Jan. 13, 2014; pp. 1-17.
U.S. Appl. No. 13/357,725; Notice of Allowance; Date Filed: Jan. 25, 2012; Date Mailed: Jan. 17, 2014; pp. 1-16.
U.S. Appl. No. 13/672,877; Final Office Action; Date Filed: Nov. 9, 2012; Date Mailed: Mar. 26, 2014; pp. 1-18.
International Search Report for International Application No. PCT/CN2013/076777; Date Mailed: Mar. 13, 2014, 11 pages.
U.S. Appl. No. 13/357,715; Non Final Office Action; Date Filed: Jan. 25, 2012; Date Mailed: Feb. 26, 2014; pp. 1-40.

(56) References Cited

OTHER PUBLICATIONS

U.S. Appl. No. 13/651,715; Non Final Office Action; Date Filed: Oct. 15, 2012; Date Mailed: Feb. 5, 2014; pp. 1-52.
U.S. Appl. No. 13,357,767; Non Final Office Action; Date Filed: Jan. 25, 2012; Date Mailed: Mar. 10, 2014; pp. 1-37.
U.S. Appl. No. 14/062,920; Non Final Office Action; Date Filed: Oct. 25, 2013; Date Mailed: Mar. 10, 2014; pp. 1-33.
U.S. Appl. No. 13/357,704; Non-Final Office Action; Date Filed: Jan. 25, 2012; Date Mailed: Mar. 18, 2014; pp. 1-36.
U.S. Appl. No. 13/357,725; Non-Final Office Action; Date Filed: Jan. 25, 2012; Mailing Date: Mar. 21, 2014; pp. 1-14.
U.S. Appl. No. 13/651,780; Notice of Allowance; Date Filed: Oct. 15, 2012; Date Mailed: Feb. 28, 2014, pp. 1-14.
U.S. Appl. No. 13/672,980; Notice of Allowance; Date Filed: Nov. 9, 2012; Date Mailed: Mar. 26, 2014; pp. 1-17.
U.S. Appl. No. 13/673,112; Notice of Allowance; Date Filed: Nov. 9, 2012; Date Mailed: Apr. 30, 2014; pp. 1-24.
U.S. Appl. No. 13/673,462; Final Office Action; Date Filed: Nov. 9, 2012; Date Mailed: Jun. 12, 2014; 19 pages.
U.S. Appl. No. 13/357,719; Final Office Action; Date Filed: Jan. 25, 2012; Date Mailed: Jun. 20, 2014; pp. 1-44.
U.S. Appl. No. 14/051,477; Non-Final Office Action; Date Filed: Oct. 11, 2013; Date Mailed Jun. 20, 2014; 31 pages.
U.S. Appl. No. 13/672,877; Notice of Allowance; Date Filed: Nov. 9, 2012; Date Mailed: Jun. 25, 2014, pp. 1-11.
U.S. Appl. No. 13,673,462; Final Office Action; Date Filed: Nov. 9, 2012; Date Mailed: Jun. 12, 2014; pp. 1-19.
U.S. Appl. No. 13/357,704; Notice of Allowance; Date Filed: Jan. 25, 2012; Date Mailed: Jun. 25, 2014, pp. 1-16.
U.S. Appl. No. 13/357,719; Final Office Action; Date Filed: Jan. 25, 2012; Date Mailed: Jan. 27, 2014; pp. 1-37.
U.S. Appl. No. 13/672,877; Final Office Action; Date Filed: May 14, 2014; Date Mailed Mar. 16, 2014; 18 pages.
U.S. Appl. No. 13/673,462; Non-Final Office Action, Date Filed: Jan. 2012; Date Mailed: Oct. 27, 2014, 14 pages.
U.S. Appl. No. 14/051,477; Notice of Allowance; Date Filed: Oct. 11, 2013; Date Mailed: Oct. 9, 2014; 13 pages.
U.S. Appl. No. 13/672,947; Notice of Allowance; Date Filed: Nov. 9, 2012; Date Mailed: Apr. 30, 2014; pp. 1-23.

* cited by examiner

| Red - L | Red - R | Blue - L | Blue - R | Green - L | Green - R |
|---|---|---|---|---|---|
| Blue - L | Blue - R | Green - L | Green - R | Red - L | Red - R |
| Green - L | Green - R | Red - L | Red - R | Blue - L | Blue - R |

FIG. 5

| Red - L | Red - R | Green - L | Green - R | Blue - L | Blue - R |
|---|---|---|---|---|---|
| Red - L | Red - R | Green - L | Green - R | Blue - L | Blue - R |
| Red - L | Red - R | Green - L | Green - R | Blue - L | Blue - R |

THREE DIMENSIONAL LCD MONITOR DISPLAY

BACKGROUND

The present invention relates to an LCD monitor, and more specifically, to a three dimensional LCD monitor usable with passive glasses.

Three dimensional (3D) movies and pictures have become a popular form of entertainment due to the increased realism of the images. 3D images utilize the human physical trait of binocular vision. Human eyes are spaced about two inches (five centimeters) apart, therefore each eye sees the world from a slightly different perspective. The brain receives both images and has a binocular vision function that correlates the difference between what each eye sees to determine distance. The determination of the distance provides the 3D effect that a person sees.

To create a binocular image on a two dimensional (2D) surface, such as a movie or television screen, the user typically wears glasses. The glasses alter the way that the user views the images to create the simulated 3D effect. Typically there are two types of glasses, passive glasses and active glasses. The type of glasses used will depend on the type of image projection system being used.

Passive glasses rely upon an optical effect created by using different lenses for each eye. The display device emits a sequential series of images where subsequent images are slightly offset. The images are arranged such that the user sees the first image through a first lens of the glasses (e.g. the right eye) and the second image is seen with the other lens (e.g. the left eye). Since the images are projected quickly, the user does not notice the multiple images, but rather sees a 3D effect. Originally, passive glasses used different color lenses to filter out images; however this limited the use of 3D images when full color images were desired. To alleviate this issue, polarized lenses were developed where each lens of the glasses allows the transmission of different polarized light. The polarized passive lenses allow for full color 3D images to be transmitted.

In systems using active glasses, the glasses wirelessly communicate with the display device to synchronize the operation of the glasses with the images being displayed. With active glasses, the lenses are typically liquid crystal displays (LCDs) that can switch between transmitting light and blocking light. In this way, the glasses may rapidly switch the left and right lenses between clear and opaque. While the glasses are switching, the television is projecting a series of sequential images. When this switching is synchronized between the television and the glasses, the user experiences a 3D effect.

An embodiment is a pixel matrix located on a LCD. The pixel matrix includes a plurality of first pixels having a first polarization, and a plurality of second pixels having a second polarization. The pixel matrix also includes a plurality of electrodes configured to activate the first pixels followed by the second pixels, the activating at twice a frame rate of the LCD.

A further embodiment is a LCD for projecting 3D images. The LCD includes a light source, a pixel matrix, and a plurality of electrodes. The pixel matrix includes a plurality of pixels and each pixel is characterized by a polarization. The plurality of pixels includes first pixels having a first polarization and second pixels having a second polarization. The plurality of electrodes is configured for applying a voltage to the plurality of pixels. Applying the voltage to a pixel changes the polarization of the pixel.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein include liquid crystal displays (LCDs) that are modified by using multiple liquid crystal cells which are alternately polarized for left and right eye views to allow a stereoscopic three dimensional (3D) image to be viewed with passive polarized eyewear. This approach doubles the number of pixels in the display, or alternately, reduces the resolution of a standard size screen by reusing half of the pixels to transmit redundant information. In an embodiment, the pixels are addressed by an x-y grid of electrodes and can be actuated sequentially to project alternate polarization left and right eye image components for each of the primary colors (red, green, blue or "RGB"). When viewed with passive eyewear, a 3D stereoscopic image is presented to the viewer. As described herein, in embodiments a pattern is used to excite the electrodes in an LCD display such that the polarized 3D information is generated efficiently for high speed modulation at twice the video frame rate of the LCD display. As used herein, the term "frame rate" refers to the frequency at which an imaging device (e.g., an LCD screen) produces unique consecutive images called frames. Frame rate is most often expressed in frames per second (FPS). Embodiments also include liquid crystal elements in the display having an increased thickness such that the degree of polarization rotation can be controlled effectively to produce polarized light for 3D imaging.

Embodiments, allow a 3D image to be viewed on a LCD screen using passive polarized eyewear. The use of passive polarized eyewear has several benefits when compared with using active glasses to view 3D images on a LCD screen. While active glasses perform well to create the 3D effect for the user, they also have some less desirable characteristics. For example, active glasses require an energy source such as a battery that needs to be periodically recharged or replaced. In addition, if the communication between the television and the glasses is interrupted, the 3D effect may be lost. Further, due to the complexity of the system, active glasses tend to be much more costly than passive glasses.

Figure 1:
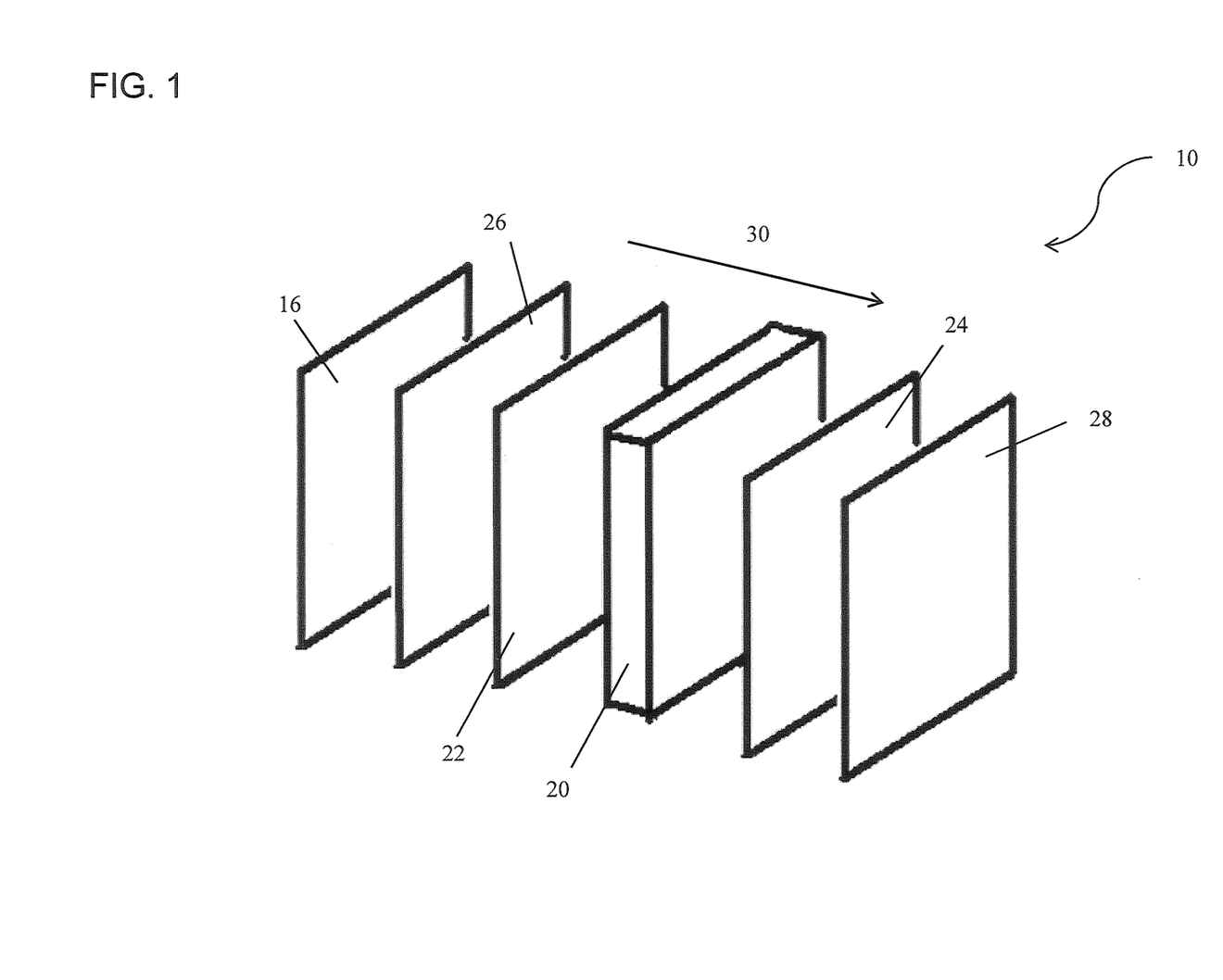
FIG. 1 is an exploded view of a conventional liquid crystal display (LCD) monitor.

With reference to FIG. 1, a conventional backlit LCD monitor 10 is generally shown. The LCD monitor 10 includes a liquid crystal layer 20 having liquid crystal molecules, or pixels, formed in a matrix. The liquid crystal layer 20 is surrounded on each side by an electrode 22, 24. Adjacent to each electrode 22, 24 is a respective polarizing filter 26, 28 that allows only light of a specific polarization to pass through. A light source 16, such as a fluorescent lamp, may be used to produce light within the LCD monitor 10. In an alternate embodiment, the LCD monitor is reflective such that instead of a light source 16, the monitor 10 includes a mirror to reflect external light. As the light passes through the first polarizing filter 26 in the direction of arrow 30, the light becomes polarized. Before applying an electric charge, the orientation of the liquid crystal molecules of the liquid crystal layer 20 is determined by the alignment at the surfaces of electrodes 22, 24. Commonly in LCD devices, liquid crystal molecules align perpendicularly at the two electrodes 22, 24 causing the molecules to arrange themselves in a helical structure. The surface of each electrode 22, 24 contacts the liquid crystal layer 20, and applies a voltage or charge to a particular liquid crystal molecule or group of liquid crystal molecules so as to "twist" the liquid crystal molecules in a particular direction. By controlling the voltage applied across the liquid crystal layer 20 in each pixel, light can be allowed to pass through in varying amounts.

Figure 2A:
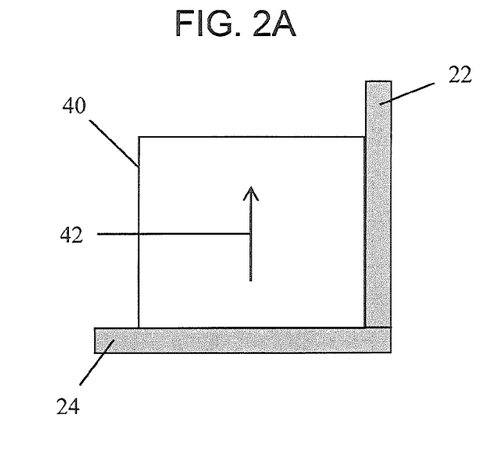
FIGS. 2A and 2B are a schematic view of a pixel in an LCD monitor in accordance with an embodiment of the invention.
Figure 2B:
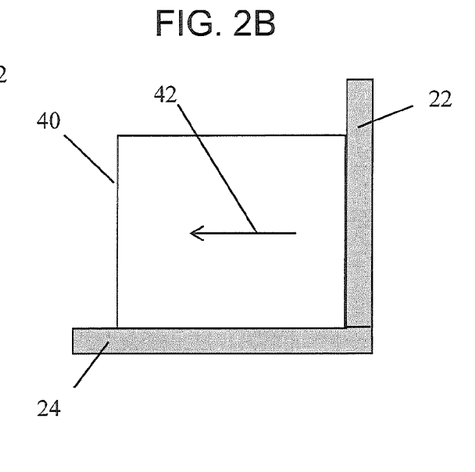
Figure 3A:
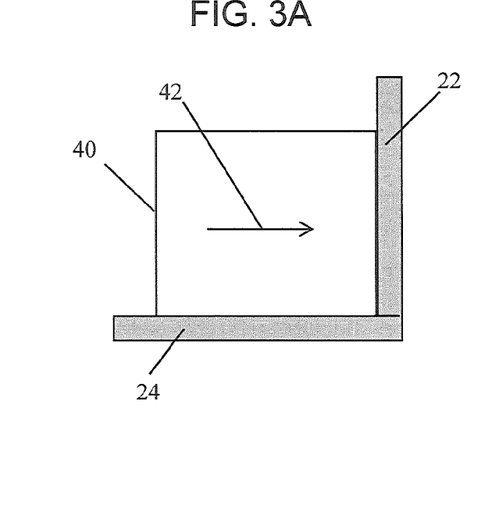
FIGS. 3A and 3B are a schematic view of a pixel in an LCD monitor in accordance with an embodiment of the invention.
Figure 3B:
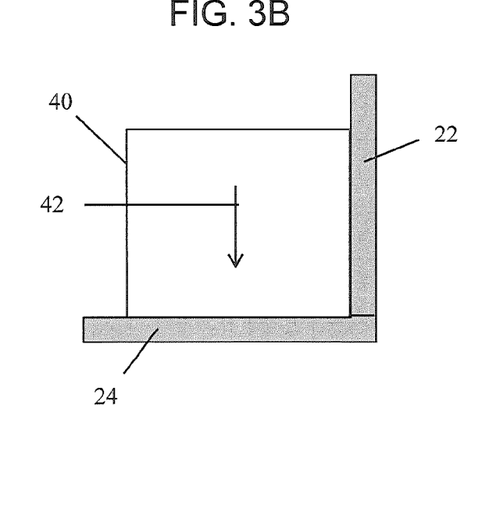

Application of a voltage to an already polarized pixel will rotate the polarization of the pixel 90 degrees. Referring now to FIG. 2A, a pixel 40 within the liquid crystal layer 20 of FIG. 1 is shown. The initial polarization of the pixel 40 is depicted by the vertical arrow 42. In an exemplary embodiment of the present invention, electrodes 22, 24 intersect at a corner of the pixel 40. In alternate embodiments, the two electrodes 22, 24 intersect at any point within the pixel 40. When a voltage is applied to the electrodes 22, 24, the direction of polarization of the pixel 40 is altered. FIG. 2B represents the same pixel 40 displayed in FIG. 2A after a voltage has been applied. The arrow 42 representing the direction of polarization of the pixel 40 has rotated 90 degrees such that the pixel 40 is now horizontally polarized. Similarly, referring to FIG. 3A, a pixel 40 is shown having an initial horizontal polarization. Once a voltage is applied to the electrodes 22, 24, the polarization of the pixel 40 converts to a vertical polarization as shown in FIG. 3B.

Figure 4:
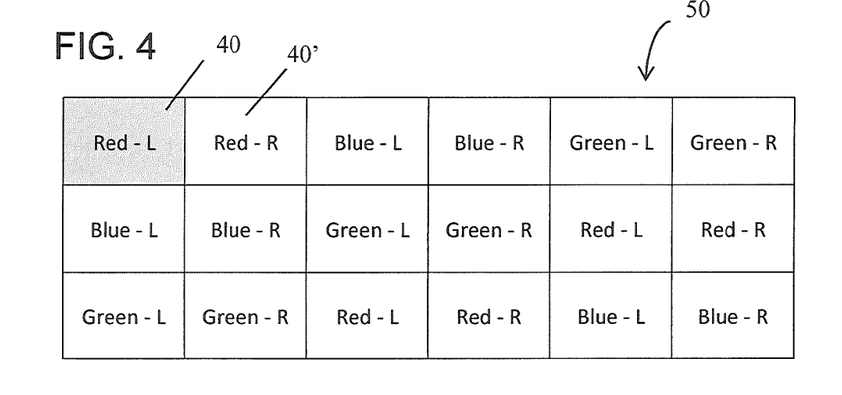
FIG. 4 is a schematic view of a matrix of an LCD monitor in accordance with an embodiment of the invention.
Figure 5:
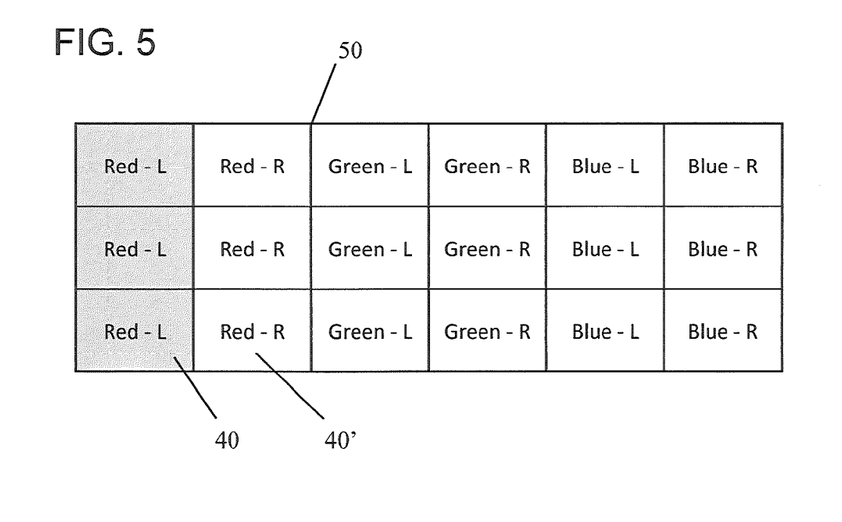
FIG. 5 is a schematic view of an alternate matrix of an LCD monitor in accordance with an embodiment of the invention.

With reference to FIGS. 4 and 5, every liquid crystal molecule in an LCD device has both a color and a polarization. In one embodiment of the present invention, each pixel in the LCD device comprises a single liquid crystal molecule. In an alternate embodiment, a pixel 40 comprises a plurality of liquid crystal molecules. If a pixel 40 does comprise more than one liquid crystal molecule, the plurality of the liquid crystal molecules within the pixel are the same color and are polarized in the same direction. As shown in embodiment in FIG. 5 for example, the three red liquid crystal molecules on the left-hand side of the pixel matrix 50 have the same polarization and therefore may be considered one pixel.

A pixel matrix 50 includes a plurality of first pixels 40 having a first polarization and a plurality of second pixels 40' having a second polarization. In one embodiment of the invention, the first polarization and the second polarization are orthogonal. Consequently, the plurality of first pixels 40 having a first polarization emit an image viewable by a first eye, such as a left eye, and the plurality of second pixels 40' having a second polarization emit an image viewable by a second eye, a right eye for example. The plurality of first pixels 40 may include a plurality of colors and the plurality of second pixels 40' may include the same plurality of colors as the plurality of first pixels. For example, the plurality of colors of both the first pixels and second pixels may include red, green and blue. In a pixel matrix 50, the pixels are arranged such that along a row, pixels alternate between the pixels having a first polarization and pixels having a second polarization. For example, a pixel from the plurality of first pixels 40 is adjacent a pixel from the plurality of second pixels 40'. Orthogonally polarized pixels 40, 40' are additionally grouped into pairs of pixels of the same color. A pair of orthogonally polarized pixels 40, 40' of a first color may not be disposed adjacent another pair of pixels of the same first color. As shown in FIG. 4, the colors of the pairs of pixels alternate along a row such that two pairs of pixels of the first two colors (e.g., R, G) are disposed between two pairs of orthogonally polarized pixels of the third color (e.g., B).

Figure 6:
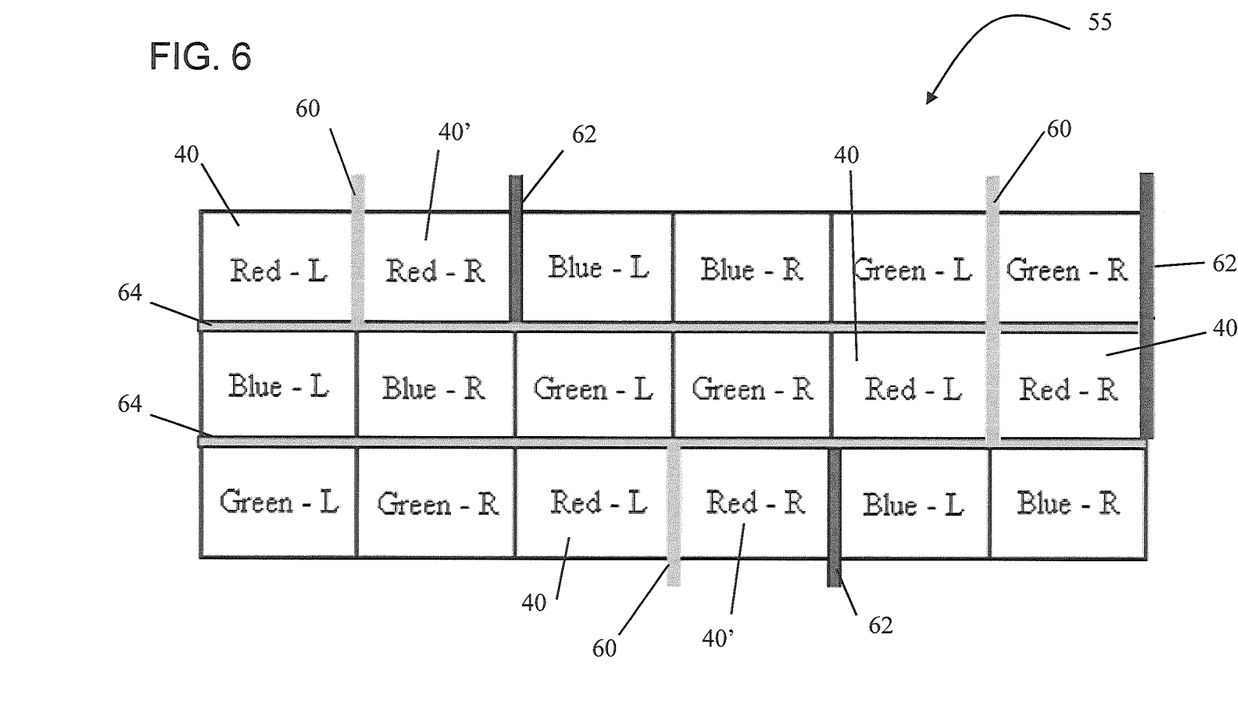
FIG. 6 is an exemplary matrix with connected electrodes of an LCD in accordance with an embodiment of the invention.

In an embodiment, in order to project a 3D image, the frame rate at which images are projected from the LCD monitor is doubled a conventional frame rate since both a left eye and right eye image must be emitted in the same time that a regular image would be projected. A pixel matrix 55 according to one embodiment of the invention is shown in FIG. 6. This exemplary pixel matrix 55 portrays the placement of a plurality of electrodes to apply a voltage to the pixels of a first color, for example red, from both the plurality of first pixels 40 and the plurality of second pixels 40'. Horizontal electrodes are located adjacent the pixel matrix 50 at the intersection of adjacent vertical pixels. In this exemplary embodiment, the pixels 40 are energized in the lower left corner; in other embodiments, the pixels may be energized other locations. Vertical electrodes 60, 62 are disposed along a vertical edge of each red pixel such that the vertical electrode 60, 62 intersects a horizontal electrode 64 at a corner of a red pixel. Vertical electrodes 60 must intersect horizontal electrodes 64 at a corner of each red pixel from the plurality of first pixels 40 and vertical electrodes 62 must intersect horizontal electrodes 64 at a corner of each red pixel from the plurality of second pixels 40'. A voltage is applied to pixels of a first color from the plurality of first pixels 40 through the intersection of electrodes 60 and 64. For example, a voltage is first applied to red pixels polarized to project an image viewable by the left eye. Application of the voltage alters the polarization of these first pixels 40 such that light of a certain polarization will be transmitted through the pixels. Sequentially, a voltage is applied at the intersection of the vertical electrodes 62 and the horizontal electrodes 64 to pixels of a first color from the plurality of second pixels 40', such as red pixels polarized to project an image viewable by the right eye.

Embodiments are not limited to the configuration shown in FIG. 6. In other embodiments. For example, the order of the red, green, and blue pixels can be altered to any desired configuration and is not limited to the representation shown in FIG. 6. Further, the pixels may be arranged such that the vertical and horizontal electrodes intersect at any part of the pixel, not just the corner of the pixel illustrated in FIG. 6. Further, the location of the left and right eye views for each color pixel may be altered to any desired configuration and is not limited to the representation shown in FIG. 6.

Figure 7:
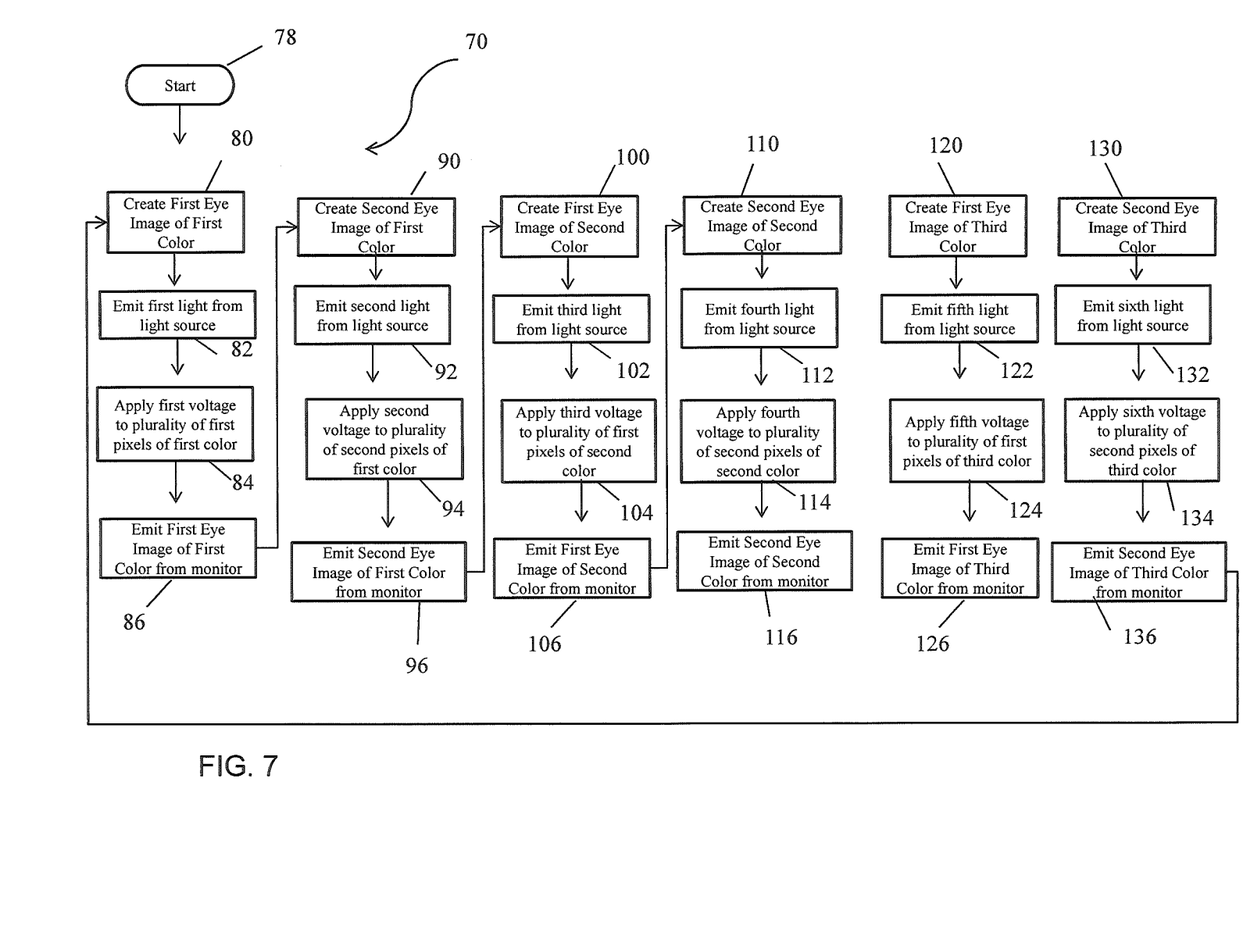
FIG. 7 is a flow chart describing a method of operating a three dimensional (3D) image projector with two color imaging in accordance with an embodiment of the invention.

Referring now to FIG. 7, a method 70 is shown for projecting a three dimensional image from an LCD monitor, such as LCD monitor 10. To create the first image in block 80, a light source, such as light source 16, emits a first light in the direction of the liquid crystal layer 20. In block 84, a first voltage is applied by intersecting electrodes, such as electrodes 60, 64, to the plurality of first pixels 40 of a same first color, for example red. By applying a voltage to these first pixels 40 of a first color, the polarization of the pixels is rotated, and an image of a first color, viewable by a first eye, such as a left eye, is projected from the monitor 10 in block 86. Sequentially, a second image in block 90 is created by projecting a second light from the light source, as in block 92. A second voltage is applied in block 94 to a plurality of second pixels 40' of the same first color as the plurality of first pixels 40 in block 84. Similar to the first pixels 40, the electric charge causes the polarization of the second pixels 40' of a first color to rotate such that a second image is emitted as shown in block 96; the image being the same first color and viewable by a second eye, such as a right eye.

Once an image has been projected by applying a voltage to both the plurality of first pixels 40 of a first color and the plurality of second pixels 40' of a first color, an image is created in block 100 using pixels of a second color from the plurality of first pixels 40. The light source 16 emits a third light in block 102. In block 104, a third voltage is applied to the plurality of first pixels 40 having a second color, such as green, to change the polarization of these pixels. The third light passes through the open pixels of the pixel matrix 50, thereby emitting an image of a second color viewable by the first eye. In block 110, the image of a second color viewable by the second eye is created. The fourth light from light source 16 is emitted, as shown in block 112, and a fourth voltage is applied to the plurality of second pixels 40' having the same second color as the plurality of first pixels 40 in block 104. Application of the voltage alters the polarization of the charged pixels, and an image of a second color viewable by the second eye is emitted from the monitor 10. Similarly, a pair of images of a third color, viewable by the first and second eye, is then sequentially emitted as shown in blocks 120, 130. In block 122, a fifth light is emitted, and in block 124 a fifth voltage is applied to pixels of a third color, for example blue, from the plurality of first pixels 40 to project an image of a third color viewable by the first eye. After the first eye image of a third color is emitted, a sixth light is emitted as shown in block 132. Similarly a sixth voltage is applied to the pixels of the third color from the plurality of second pixels 40', and an image of a third color viewable by the second eye is projected from the monitor 10. Once images for the plurality of colors have been projected in pairs for both the first and second eyes, the method 70 then loops back to block 80 to continue projecting images from the monitor 10 in the color sequence. The frame rate of all six of these images that are projected from the LCD monitor is doubled in comparison to a conventional frame rate since both a left eye and right eye image must be emitted in the same time as a regular image.

In an alternate embodiment of the invention, all of the images viewable by the first eye are projected before the images viewable by the second eye are projected. Pixels of a first color from the plurality of first pixels 40 are charged to emit a first image. Instead of then projecting an image using the pixels of the same color from the plurality of second pixels 40', an image is created by applying a voltage to pixels of a second color from the plurality of first pixels 40. An image will be created for each color of the plurality of colors of the plurality of first pixels 40. Once all of the first eye images have been emitted, images for the second eye will then be projected in the same color sequence. For example, if a red image, a green image, and then a blue image were projected viewable by the left eye, a red image, green image and then a blue image will be projected in that order viewable by the right eye. Similar to the alternate projection sequence previously discussed, all six of these images must be projected within the same time that a regular image is projected.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The invention claimed is:

1. A pixel matrix located on a liquid crystal display (LCD) for projecting three dimensional (3D) images including a first image and a second image, the pixel matrix comprising:
   a plurality of first pixels having a first polarization, the plurality of first pixels comprising liquid crystal molecules of a plurality of colors;
   a plurality of second pixels having a second polarization, the plurality of second pixels comprising liquid crystal molecules of the plurality of colors, and the plurality of first pixels and the plurality of second pixels arranged in a single plane in the pixel matrix, wherein each of the plurality of first pixels is paired and arranged directly adjacent to one of the plurality of second pixels to define a pair of orthogonally polarized pixels, each of the pixels in each of the pair of orthogonally polarized pixels being the same color, wherein each pair of orthogonally polarized pixels is not positioned directly adjacent another pair of orthogonally polarized pixels of the same color, wherein at least one of the plurality of second pixels being paired with at least one of the plurality of first pixels; and
   a plurality of electrodes including vertical electrodes and horizontal electrodes configured to activate the first pixels followed by the second pixels, the activating at twice a frame rate of the LCD,
   wherein the pixel matrix is configured for:
   projecting the first image, the projecting the first image comprising receiving a first light from a light source and using at least one of the vertical electrodes and at least one of the horizontal electrodes that intersect with each other and that are disposed along at least one edge of at least one of the plurality of first pixels to activate at least one of the plurality of first pixels; and projecting the second image, the projecting the second image comprising receiving a second light from the light source and using at least one of the vertical electrodes and at least one of the horizontal electrodes that intersect with each other and that are disposed along at least one edge of at least one of the plurality of second pixels to activate at least one of the plurality of second pixels.

2. The pixel matrix according to claim 1, wherein the pixel matrix is a passive matrix.

3. The pixel matrix according to claim 1, wherein the pixel matrix is an active matrix.

4. The pixel matrix of claim 1, wherein the first polarization is orthogonal to the second polarization.

5. The pixel matrix of claim 1, wherein the 3D image is viewable with passive eyewear.

6. A liquid crystal display (LCD) for projecting three dimensional (3D) images including a first image and a second image, the LCD comprising:

a light source;

a pixel matrix comprising a plurality of pixels, each pixel characterized by a polarization, the plurality of pixels including first pixels having a first polarization and second pixels having a second polarization, the plurality of the first pixels comprising liquid crystal molecules of a plurality of colors and the plurality of second pixels comprising pixels comprising liquid crystal molecules of the plurality of colors, the plurality of first pixels and the plurality of second pixels arranged in a single plane in the pixel matrix, wherein each of the plurality of first pixels is paired and arranged directly adjacent to one of the plurality of second pixels to define a pair of orthogonally polarized pixels, each of the pixels in each of the pair of orthogonally polarized pixels being the same color, wherein each pair of orthogonally polarized pixels is not positioned directly adjacent another pair of orthogonally polarized pixels of the same color, wherein at least one of the plurality of second pixels being paired with at least one of the plurality of first pixels; and a plurality of electrodes including vertical electrodes and horizontal electrodes configured for applying a voltage to the plurality of pixels, wherein applying the voltage to a pixel changes the polarization of the pixel, wherein the LCD is configured for:

projecting the first image, the projecting the first image comprising emitting a first light from the light source and applying the voltage to at least one of the plurality of first pixels using at least one of the vertical electrodes and at least one of the horizontal electrodes that intersect with each other and that are disposed along at least one edge of the at least one of the plurality of first pixels; and projecting the second image, the projecting the second image comprising emitting a second light from the light source and applying the voltage to at least one of the plurality of second pixels, using at least one of the vertical electrodes and at least one of the horizontal electrodes that intersect with each other and that are disposed along at least one edge of the at least one of the plurality of second pixels.

7. The LCD of claim 6, wherein the first polarization is orthogonal to the second polarization.

8. The LCD of claim 6, wherein each of the plurality of pixels comprises a single liquid crystal molecule.

9. The LCD of claim 6, wherein each of the plurality of pixels comprises multiple liquid crystal molecules.

10. The LCD of claim 6, wherein the 3D images are viewable with passive eyewear.

* * * * *